United States Patent [19]

Canivenc et al.

[11] Patent Number: 5,540,952
[45] Date of Patent: Jul. 30, 1996

[54] NON-YELLOWING TEXTILE SOFTENING PROCESS IN WHICH A COMPOSITION COMPRISING A POLYORGANOSILOXANE IS USED

[75] Inventors: Edith Canivenc; Jose-Luis Roca-Ortega, both of Lyons; Andrew Van Der Spuy, Charbonnieres, all of France

[73] Assignee: Rhone-Poulenc Chimie, Courbevoie, France

[21] Appl. No.: 360,409

[22] Filed: Dec. 21, 1994

[30] Foreign Application Priority Data

Dec. 27, 1993 [FR] France .................. 93 15949

[51] Int. Cl.$^6$ .................. B05D 7/02
[52] U.S. Cl. .................. 427/387; 427/392; 427/396
[58] Field of Search .................. 528/10, 40; 427/387, 427/389.9, 392, 394, 396; 524/99

[56] References Cited

U.S. PATENT DOCUMENTS

| | | | |
|---|---|---|---|
| 4,234,699 | 11/1980 | Rody et al. | 525/55 |
| 4,859,759 | 8/1989 | Maycock et al. | 528/27 |
| 4,927,898 | 5/1990 | King, III et al. | 528/27 |
| 5,051,458 | 9/1991 | Costanzi et al. | 524/99 |
| 5,189,086 | 2/1993 | Galbo | 524/103 |
| 5,200,443 | 4/1993 | Hudson | 524/99 |
| 5,219,905 | 6/1993 | Carroza et al. | 524/102 |
| 5,225,113 | 7/1993 | Busetto et al. | 252/586 |
| 5,244,947 | 9/1993 | Nohr et al. | 524/91 |

FOREIGN PATENT DOCUMENTS 2007931 8/1990 Canada .

*Primary Examiner*—Shrive Beck
*Assistant Examiner*—Erma Cameron
*Attorney, Agent, or Firm*—Andrew M. Solomon

[57] ABSTRACT

Process for conditioning textile materials in order to enable them to have, especially, a pleasant handle and a very low or even non-existent yellowing, characterized in that the textile materials are brought into contact with a composition comprising a polyorganosiloxane having, per mole, at least one unit of general formula:

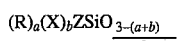

in which:

R can represent a $C_1$–$C_4$ alkyl radical;

X can represent a hydrolysable radical;

Z represents a residue containing (a) sterically hindered piperidyl group(s) of formulae:

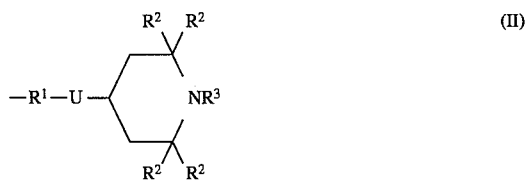

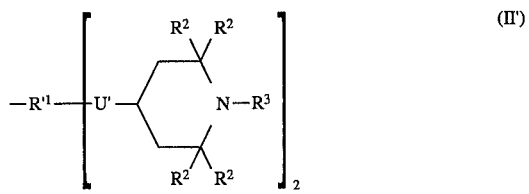

in which $R^1$ is a divalent hydrocarbon radical, $R'^1$ is a trivalent hydrocarbon radical, U and U' represent —O—, —NH— or —N(alkyl)—, $R^2$ can represent a $C_1$–$C_3$ alkyl radical and $R^3$ is H or $R^2$, a and b are chosen from 0, 1 and 2, the sum a+b being not greater than 2.

10 Claims, No Drawings

NON-YELLOWING TEXTILE SOFTENING PROCESS IN WHICH A COMPOSITION COMPRISING A POLYORGANOSILOXANE IS USED

The present invention relates to a process for conditioning fibrous materials and, more precisely, to a process for conditioning textile materials.

The expression "fibrous materials" is understood to define natural or material fibres such as, for example, wool, cotton, linen, a polyester, a polyamide, a polyacrylate or a mixture of these types.

It is known to treat fibrous materials with compositions comprising a polyorganosiloxane containing (an) amine functional group(s) with the aim of giving desirable properties to these materials, especially to give them a pleasant feel to the hand, that is to say softness. Mention may be made, as documents illustrating this prior art, of, for example, U.S. Pat. No. 4,247,592, where a description is given of the use of a polyorganosiloxane carrying (a) unit(s) of formula:

where x is a number ranging from 3 to 8 and x'=0 or 1, or EP-A-0,546,231, where a description is given of the use of a polyorganosiloxane carrying (a) unit(s) of formula:

where y is a number ranging from 2 to 8 and y'=0 or 1.

However, during the use of compositions comprising similar polyorganosiloxanes containing (an) amine functional group(s), in conventional techiques of the textile industry, especially the impregnation technique known as "padding", a yellowing of the treated fibres is observed; this yellowing is the result of the thermal oxidation of the amino groups of the polyorganosiloxane which is deposited on the fibres.

It has now been found, and it is this which constitutes the subject of the present invention, that the use in a softening process of polyorganosiloxanes carrying (a) sterically hindered piperidyl functional group(s) makes it possible to greatly restrict and even suppress the yellowing phenomenon of the treated textile material, while maintaining the softening results attached to the use of the aminated silicone compounds of the prior art.

More precisely, the present invention relates to a process for conditioning textile materials which makes it possible to obtain textile materials which especially have a pleasant handle and a very low (or even absence of) yellowing, characterized in that the textile materials are brought into contact with a composition comprising a polyorganosiloxane having, per mole, at least one unit of general formula:

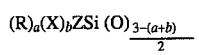

in which:
the symbols R are identical or different and represent a monovalent hydrocarbon radical chosen from linear or branched alkyl radicals having from 1 to 4 carbon atoms, the phenyl radical and the 3,3,3-trifluoropropyl radical;
the symbols X are identical or different and represent a monovalent radical chosen from a hydroxyl group and a linear or branched alkoxy radical having from 1 to 3 carbon atoms;

Z represents a residue containing (a) sterically hindered piperidyl group(s) chosen from:
the residues of formula:

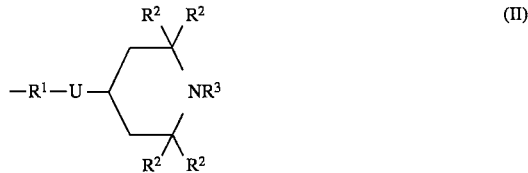

in which:
$R^1$ is a divalent hydrocarbon radical chosen from:
linear or branched alkylene radicals having from 2 to 18 carbon atoms;
alkylenecarbonyl radicals in which the linear or branched alkylene part contains 2 to 20 carbon atoms;
alkylenecyclohexylene radicals in which the linear or branched alkylene part contains from 2 to 12 carbon atoms and the cyclohexylene part contains an —OH group and optionally 1 or 2 alkyl radicals having from 1 to 4 carbon atoms;
radicals of formula —$R_4$—O—$R^5$— in which the radicals $R^4$ and $R^5$, which are identical or different, represent alkylene radicals having 1 to 12 carbon atoms;
radicals of the formula —$R^4$—O—$R^5$— in which the radicals $R^4$ and $R^5$ have the meanings indicated above and one of them or both are substituted by one or two —OH group(s);
radicals of formulae —$R^4$—COO—$R^5$— and —$R^5$—OCO—$R^5$— in which $R^4$ and $R^5$ have the meanings above;
radicals of formula —$R^6$—O—$R^7$—O—CO—$R^8$— in which $R^6$, $R^7$ and $R^8$, which are identical or different, represent alkylene radicals having from 2 to 12 carbon atoms and the radical $R^7$ is optionally substituted by a hydroxyl group;
U represents —O— or —$NR^9$—, $R^9$ being a radical chosen from a hydrogen atom, a linear or branched alkyl radical having from 1 to 6 carbon atoms, a divalent radical —$R^1$— having the meaning indicated above, one of the valency bonds being connected to the nitrogen atom of —$NR^9$— and the other being connected to a silicon atom, and a divalent radical of formula:

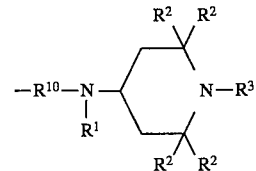

in which $R^1$ has the meaning indicated above, $R^2$ and $R^3$ have the meanings indicated hereinbelow and $R^{10}$ represents a linear or branched alkylene radical having from 1 to 12 carbon atoms, one of the valency bonds (that of $R^{10}$) being connected to the nitrogen atom of —$NR^9$— and the other (that of $R^1$) being connected to a silicon atom;
$R^2$ are radicals, which are identical or different, chosen from linear or branched alkyl radicals having from 1 to 3 carbon atoms and the phenyl radical;
$R^3$ represents a hydrogen atom or the radical $R^2$;

and those of formula:

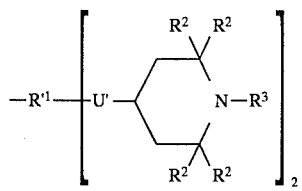 (II')

in which
R'¹ is chosen from a trivalent radical of formula:

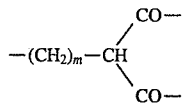

where m represents a number from 2 to 20,
and a trivalent radical of formula:

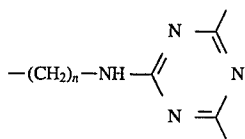

where n represents a number from 2 to 20;
U' represents —O— or —NR¹¹—, R¹¹ being a hydrogen atom or a linear or branched alkyl radical having from 1 to 6 carbon atoms;
R² and R³ have the same meanings as those given with respect to the formula (II);
a is a number chosen from 0, 1 and 2;
b is a number chosen from 0, 1 and 2;
the sum a+b is not greater than 2.

The polyorganosiloxane used can additionally comprise at least one other siloxyl unit of formula:

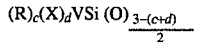 (III)

in which:
the symbols R and X have the same meanings as those given hereinabove with respect to the formula (I);
the symbol V represents: a linear or branched alkyl radical having from 5 to 20 carbon atoms; a radical of formula —(CH$_2$)$_p$—COO—R¹² in which p represents a number from 5 to 20 and R¹² represents a linear or branched alkyl radical containing 1 to 12 carbon atoms; a radical of formula —(CH$_2$)$_q$—O—R¹³ in which q represents a number from 3 to 10 and R¹³ represents a hydrogen atom, an ethylene oxide chain, a propylene oxide chain, a mixed ethylene oxide+propylene oxide chain or an acyl radical having from 2 to 12 carbon atoms;
c is a number chosen from 0, 1 and 2;
d is a number chosen from 0, 1 and 2;
the sum c+d is not greater than 2.

The polyorganosiloxane used can additionally comprise (an) other siloxyl unit (s) of formula:

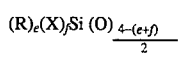 (IV)

in which:
R and X have the same meanings as those given with respect to the formula (I);
e is a number chosen from 0, 1, 2 and 3;
f is a number chosen from 0, 1, 2 and 3;
the sum e+f is not greater than 3.

The siloxyl units of formula (I), when there are more than two of them, can be identical or different from one another; the same comment also applies to the siloxyl units of formulae (III) and (IV).

The polyorganosiloxane used can have a linear, cyclic or branched structure (in the presence of units of types T and/or Q) or a mixture of these structures. In the case of the presence of monoorganosiloxy units of type T and/or of units Q (SiO$_2$), these units are in the proportion of at most 10% with respect to the number of diorganosiloxy units of type D.

The polyorganosiloxane used is, for example, a linear polydiorganosiloxane of average formula:

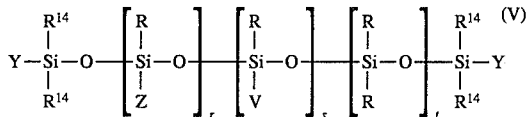 (V)

in which:
the symbols R, Z and V have the meanings given hereinabove with respect to the formulae (I) and (III);
the symbol Y represents a monovalent radical chosen from the radicals R, Z, V and X;
the symbols R¹⁴ are identical or different and represent a monovalent radical chosen from a radical R and a radical X such as defined hereinabove with respect to the formula (I);
r, s and t are equal to zero or represent integers or fractional numbers greater than 0, with the additional condition according to which, if r=0, at least one of the two radicals Y represents the radical Z.

Preferably, in the process of the invention, the composition used comprises a polyorganosiloxane containing (a) unit(s) of formulae (I)+optionally (III)+optionally (IV) or a polyorganosiloxane of formula (V):
which has per mole, on average: from 2 to 1600 silicon atoms, from 1 to 100 residues Z, such as those defined hereinbelow, and from 0 to 50 residues V, such as those defined hereinbelow;
and in the structure of which:

R is chosen from methyl, ethyl, n-propyl and isopropyl radicals;

X is chosen from hydroxyl, methoxy and ethoxy radicals;

Z is chosen from residues containing (a) piperidyl group(s):
of formula (II) in which:
R¹ represents a hydrocarbon radical chosen from:
linear or branched alkylene radicals having from 3 to 12 carbon atoms;
the radical —(CH$_2$)$_{10}$—CO—;
alkylenecyclohexylene radicals in which the linear or branched alkylene part contains from 2 to 6 carbon atoms and the cyclohexylene part contains an —OH group and optionally 1 or 2 alkyl substituents having 1 to 4 carbon atoms;
radicals of formula —R⁴—O—R⁵— in which the radicals R⁴ and R⁵, which are identical or different, represent alkylene radicals having 2 to 6 carbon atoms;
radicals of formula —R⁴—O—R⁵— in which the radicals R⁴ and R⁵ have the meanings indicated above and R⁵ is substituted by an —OH group;
radicals of formulae —R⁴—COO—R⁵— and —R⁴—OCO—R⁵— in which R⁴ and R⁵ have the meanings above;

radicals of formula —R⁶—O—R⁷—O—CO—R⁸— in which R⁶, R⁷ and R⁸, which are identical or different, represent alkylene radicals having from 2 to 6 carbon atoms and the radical R⁷ is substituted by a hydroxyl group;

U represents —O— or —NR⁹— where R⁹ is a linear or branched alkyl radical having from 1 to 4 carbon atoms;

R² represents a methyl radical;

and those of formula (II') in which:

R¹¹ is chosen from:

a trivalent radical of formula:

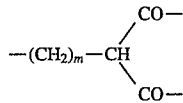

where m represents a number from 2 to 10, and a trivalent radical of formula:

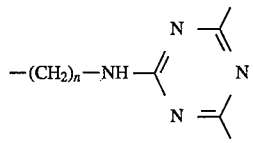

where n represents a number from 2 to 10;

U' represents —O— or —NR¹¹—, R¹¹ being a linear or branched alkyl radical having from 1 to 4 carbon atoms;

R² represents a methyl radical;

V is chosen from: a linear or branched alkyl radical having 5 to 18 carbon atoms; a radical of formula —(CH₂)₁₀—COO—R¹² in which R¹² represents a linear alkyl radical containing 1 to 6 carbon atoms; a radical of formula —(CH₂)₃—O—R¹³ where R¹³ represents a hydrogen atom, an ethylene oxide chain, a propylene oxide chain, a mixed ethylene oxide+propylene oxide chain or an acyl group having from 2 to 6 carbon atoms.

In the context of this preferential embodiment, the linear polydiorganosiloxane of formula (V) has the following values for the symbols r, s and t:

r is an integer or fractional number ranging from 0 to 98 with a condition according to which, if r=0, at least one of the two radicals Y represents the radical Z;

s is an integer or fractional number ranging from 0 to 48;

t is an integer or fractional number ranging from 0 to 1598;

the sum r+s+t is an integer or fractional number ranging from 0 to 1598.

More preferentially, in the process of the invention, the composition used comprises a polyorganosiloxane containing units of formula (I)+(IV)+optionally (III) or a polyorganosiloxane of the formula (V):

which has per mole, on average: from 5 to 800 silicon atoms, from 1 to 60 residues Z, such as those defined hereinbelow, and from 0 to 20 residues V, such as those defined hereinbelow;

and in the structure of which:

R is a methyl radical;

X is chosen from hydroxyl and methyl radicals;

Z is chosen from residues containing (a) piperidyl group(s):

of formula (II) in which:

R¹ represents a trimethylene, decamethylenecarbonyl, 2-hydroxy-4-oxaheptamethylene or 6-hydroxy-4,8-dioxa-3-oxoundecamethylene radical;

U represents —O— or —NR⁹— where R⁹ is chosen from methyl, ethyl, n-propyl and n-butyl radicals;

R² represents a methyl radical;

R³ represents a hydrogen atom;

and those of the formula (II') in which:

R¹¹ is chosen from the radicals of formulae:

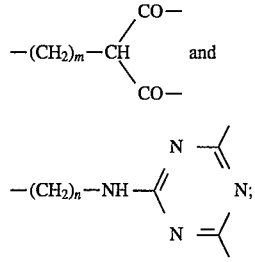

U' represents —O— or —N—R¹¹— where R¹¹ is chosen from methyl, ethyl, n-propyl and n-butyl radicals;

R² represents a methyl radical;

R³ represents a hydrogen atom;

V is chosen from n-octyl and methyl or ethyl decamethylenecarboxylate radicals.

In the context of this more preferential embodiment, the linear polydiorganosiloxane of formula (V) has the following values for the symbols r, s and t:

r is an integer or fractional number ranging from 0 to 58 with the condition according to which, if r=0, at least one of the two radicals Y represents the radical Z;

s is an integer or fractional number ranging from 0 to 18;

t is an integer or fractional number ranging from 3 to 798;

the sum r+s+t is an integer or fractional number ranging from 3 to 798.

Generally, in the process according to the present invention, 100 g of polyorganosiloxane such as those defined above comprise 5 to 200 milliequivalents (meq) of (a) hindered piperidyl group(s).

The polyorganosiloxanes defined above, for example those of formula (V) where R¹⁴ is R, can be prepared from a polyorganosiloxane compound containing (a) functional group(s) ≡SiH of formula:

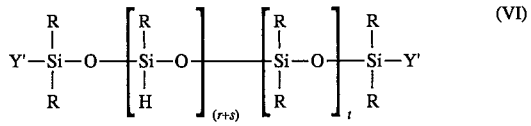

in which:

the symbols R, r, s and t have the general or preferential meanings given hereinabove for the formula (V);

the symbol Y' represents R, a linear or branched alkoxy radical having from 1 to 3 carbon atoms or a hydrogen atom.

Replacement of the hydrogen atoms of the compound (VI) by the residue Z of formula (II) or (II') and optionally by the residue V is carried out by reaction of the compound containing (a) functional group(s) ≡SiH of formula (VI) with another compound having an ethylenic unsaturation capable of reacting by a hydrosilylation reaction in the presence of an appropriate catalyst, such as, for example, a platinum catalyst; this other compound will therefore be the unsaturated precursor of the residue Z of formula (II) or (II') or of the residue V. Mention may be made, as precursor of the residue V, by way of examples, of 1-octene, methyl undecenoate, 1-dodecene or 1-octadecene. Mention may be made, as precursor of the residue Z of the formula (II), by way of example, of 4-allyloxy-2,2,6,6-tetramethylpiperidine. Mention may be made, as precursor of the residue Z of formula (II'), by way of example, of bis(2,2,6,6-tetramethyl-4-piperidyl) allylmalonate. For further details regarding this process, reference may be made to the document FR-A-2, 642,764.

It is alternatively possible, to form the residue Z of formula (II), to carry out the reaction in the following way: in a first stage, a hydrosilylation reaction is carried out between the compound containing (a) functional group(s) ≡SiH of formula (VI) and a difunctional precursor of the radical $R^1$ carrying, on the one hand, an ethylenic double bond which will react with the ≡SiH functional groups and, on the other hand, a group capable of reacting with a precursor of the radical —U— (hindered piperidyl) and then, in a second stage, a second reaction is carried out which is targeted at attaching the said precursor of the radical —U— (hindered piperidyl) to the product obtained on conclusion of the first stage.

By way of example, when U represents $NR^9$, use is advantageously made, as precursor of the radical $R^1$, of a compound containing an ethylenic double bond and an epoxy group, such as especially 3-allyloxy-1,2-epoxypropane. On conclusion of the first stage, there is then formed a product corresponding to the starting compound of formula (VI) in which all or part of the hydrogen atoms have been replaced by the radicals

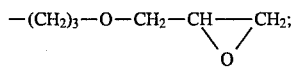

in the second stage, the epoxidized product thus obtained is reacted with the precursor of formula $HNR^9$— (hindered pyridyl).

The hydrosilylation reaction between the ≡Si—H functional groups of the organosiloxane compound (VI) and the precursor compounds of the radicals Z and V can be carried out simultaneously by adjusting the molar ratios of the various reactants, as a function of the numbers r and s desired. This reaction, known per se, is carried out in the presence of an appropriate catalyst such as, for example, a platinum catalyst.

The polyorganosiloxanes defined above, for example those of formula (V) where s=0, can be prepared, by a process containing hydrolysis and polycondensation stages, in the presence if necessary of a basic catalyst, from a mixture, in suitable proportions, of the following reactants, a hydrolysable silane of formula:

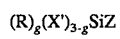 (VII)

in which the symbols R and Z have the general or preferential meanings given hereinabove for the formula (I), g is a number chosen from 0, 1 and 2 and the symbol X' represents a linear or branched alkoxy group having from 1 to 3 carbon atoms;

a polydiorganosiloxane corresponding to the formula (V) where r=0, s=0, t=10–500, $R^{14}$ is R and Y is OH, and/or a cyclic polydiorganosiloxane of formula:

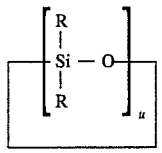 (VIII)

in which R has the general or preferential meaning given hereinabove for the formula (I) and u is an integer or fractional number ranging from 3 to 10;

and optionally a chain-terminating agent consisting of a compound of formula (V) where r=0, s=0, t=0–50, $R^{14}$ is R and Y is R or Z [R and Z having the general or preferential meanings given hereinabove for the formula (I)].

The polyorganosiloxanes defined above, corresponding to the formula (V) where s=0, can alternatively be prepared by another process consisting in carrying out the polycondensation, in the presence if necessary of an acidic or basic catalyst, of a mixture in suitable proportions of the following reactants:

a polydiorganosiloxane or a mixture of polydiorganosiloxanes of formula (e):

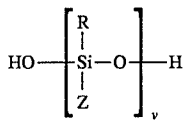 (IX)

and/or

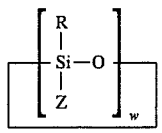 (X)

where the symbols R and Z have the general or preferential meanings given hereinabove for the formula (I), v is an integer or fractional number ranging from 10 to 500 and w is an integer or fractional number ranging from 3 to 10;

a polydiorganosiloxane corresponding to the formula (V) where r=0, s=0, t=10–500, $R^{14}$ is R and Y is OH, and/or a cyclic polydiorganosiloxane of formula (VIII);

and optionally a chain-terminating agent consisting of a compound of formula (V) where R=0, s=0, t=0–50, $R^4$ is R and Y is R or Z [R and Z having the general or preferential meanings given hereinabove for the formula (I)].

The abovementioned synthetic routes of the polyorganosiloxanes of formula (V), based on polycondensation reactions, are carried out at a temperature lying in the range from 120° C. to 160° C. for a period of time which will depend on the temperature chosen and can vary, for example, between 3–4 hours, the reaction being carried out at approximately 150° C., and 5–6 hours, the reaction being carried out at approximately 130° C.

As regards the catalyst which can be used, and the use of a catalyst corresponds to a preferred embodiment, recourse may be had to a base consisting of a hydroxide, carbonate or bicarbonate of an alkali metal, such as for example sodium or potassium, or, if appropriate, to an acid consisting of a strong inorganic mono- or polyacid, which may or may not contain oxygen, such as for example hydrochloric, nitric, sulphuric or phosphoric acid. The amount of catalyst, when one of them is used, expressed by the percentage by weight of pure base or pure acid with respect to the weight of the combined silicone reactants involved, lies in the range from 0.005 to 5%.

At the end of the reaction, when a catalyst has been used, the medium is brought to neutral pH by addition of a specific amount of an appropriate neutralizing agent.

In the process of the invention, the composition comprising a polyorganosiloxane containing (a) unit(s) of formulae (I)+optionally (III)+optionally (IV) or a polyorganosiloxane of formula (V) can be in the form of solutions, dispersions or emulsions. The solutions are generally prepared using organic solvents. The dispersions can be prepared by using aqueous media or organic diluents. Emulsions are generally of the oil-in-water emulsions type and are prepared according to conventional methods by using water and appropriate surface-active agents.

The process according to the present invention can be implemented on any woven or knitted fabric and even on those made of non-woven material.

The fibres used for producing these fabrics can be especially made of cotton, polyester, polyamide, viscose, polyacrylate, wool, linen or cellulose acetate as well as elastomeric fibres. Of course, it is possible to use mixtures of fibres.

In the process according to the present invention, in order to apply the composition comprising the polysiloxane to the fabric to be treated, use is made of the conventional techniques of the textile industry, especially by resorting to the impregnation technique known as padding.

When the fabric is treated with an aqueous composition or a composition comprising an organic diluent or solvent, this fabric is then subjected to a heat treatment in order to quickly drive off the water, the diluent or the solvent in the form of vapour.

Generally, the amount of polysiloxane deposited on the treated textile material corresponds to an amount of between 0.1 and 2% by weight with respect to the weight of the dry treated textile material.

The examples which will follow illustrate the preparation of polyorganosiloxanes containing (a) sterically hindered piperidyl functional group(s) and their use in the process according to the present invention.

EXAMPLE 1

Preparation of a polydiorganosiloxane containing tetramethylpiperidine functional groups.

The following are introduced into a reactor equipped with a stirrer, a thermometer, a dropping funnel, a reflux condenser and a system for introducing dry nitrogen:

447.7 g (2.1 mol) of 4-n-butylamino-2,2,6,6-tetramethylpiperidine, 1,000 g of epoxidized polydiorganosiloxane compound of average formula:

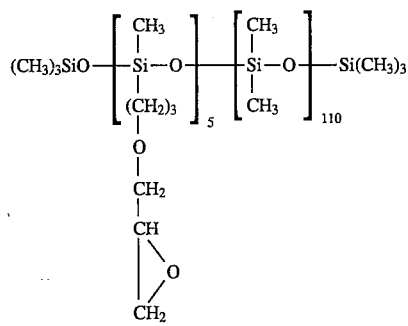

assaying at 52.7 meq/100 g of glycidyl functional groups (meq=milliequivalent), and 217 g of isoamyl alcohol.

All the reactants were degassed beforehand with nitrogen before introduction into the reactor. The reaction medium is brought to 135°–140° C. After reacting for 10 hours, the isoamyl alcohol and the excess amine are removed by distillation under reduced pressure (1.33–2.66·10² Pa) for 7 hours. There are thus obtained 1104.2 g of silicone oil and 557.3 g of distillate.

The basicity value

tertiary amino and NH residue of the piperidyl nucleus) determined on the oil using a titrated perchloric acid solution (0.1N) is 98.5 meq/100 g of polymer, the theoretical value being 94.8 meq/100 g.

Proton and silicon nuclear magnetic resonance (NMR) analyses are carried out. Interpretation of the spectra confirms the structure of the expected product, that is to say a product of average formula (product P1):

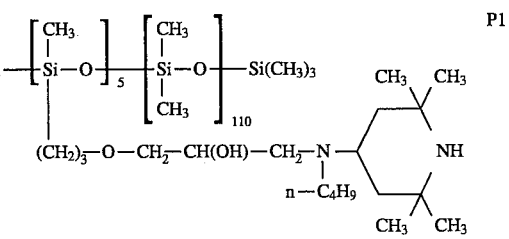

EXAMPLE 2

The same operations are carried out as in Example 1, using:

4 g (0.0188 mol) of 4-n-butylamino-2,2,6,6-tetramethylpiperidine, 50 g of epoxidized polydiorganosiloxane compound corresponding to the formula given in Example 1 but comprising 670 $(CH_3)_2SiO_{2/2}$ units instead of 110 and assaying at 9.4 meq/100 g of glycidyl functional groups, and 8.1 g of isoamyl alcohol.

After reacting for 7 hours at 140° C. and removal of the volatile species, 46 g of silicone oil and 9.9 g of distillate are obtained.

A basicity value of 18.7 meq/100 g (the theoretical value being 18.8 meq/100 g) is determined by titrating the silicone oil with a perchloric acid solution (0.02N).

Proton and silicon nuclear magnetic resonance (NMR) analyses are carried out. Interpretation of the spectra confirms the structure of the expected product, that is to say a product of average formula (product P2):

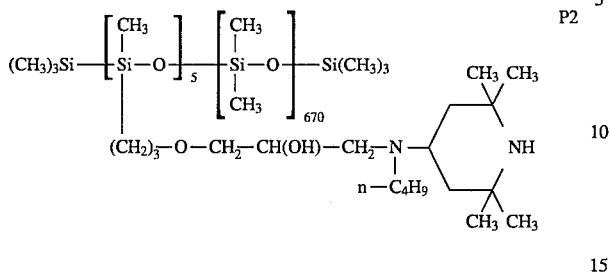

EXAMPLE 3

Description of an application test of the silicone products P1 and P2 according to Examples 1 and 2.

A square (15×15 cm) of sky-blue, serge-like, 67/33 by weight polyester/cotton cloth, with a density of 200 g/m², is immersed in a white spirit solution containing 2.3% by weight of the silicone product to be tested. After straining, the cloth is dried at 40° C. for 15 minutes in a ventilated oven and then heated at 160° C. for 30 minutes. The level of silicone product deposited on the cloth is of the order of 1% by weight.

Measuring in order to evaluate the yellowing of the treated piece of cloth is carried out using an ACS Sensor II spectrophotometer marketed by the Company Data Color with use of the luminant device D65 which reproduces natural light and the calculation method is that well known in the textile industry for measuring the whiteness index WI 313.

The result of the measurement is expressed in the following way:

ΔWI=WI control cloth−WI treated cloth where WI control cloth:

whiteness index of the cloth treated with the white spirit solution in the absence of silicone product and then dried and heated (average index over 3 measurements carried out on different parts of the cloth), WI treated cloth:

whiteness index of the cloth treated with the solution of silicone product in white spirit and then dried and heated (average index over 3 measurements carried out on different parts of the cloth).

The degrees of yellowing, expressed by the relative whiteness index ΔWI, of the various cloths treated with:

the silicone products P1 and P2 resulting from Examples 1 and 2;

in Comparative Example A: a silicone compound of average formula (compound C1):

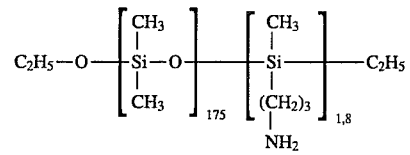

in Comparative Example B: a silicone compound of average formula (compound C2):

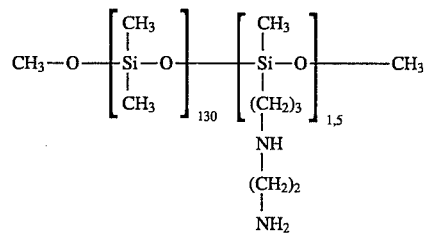

in Comparative Example C: a silicone compound of average formula (compound C3):

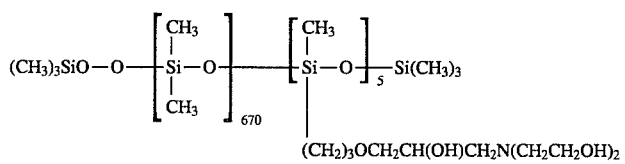

which was prepared according to the information given in EP-A-0,546,231;

are shown in the following table. The results of the handling tests of the treated cloths also appear in this table; these tests are carried out by hand by 6 people and the result is expressed either as pleasant soft handle (PS) or as unpleasant, softness-free handle (US).

| Ex. | Silicone product and Functionalization | | Basicity value in meq/100 g of product | ΔWI | Handle |
|---|---|---|---|---|---|
| 1 | P1 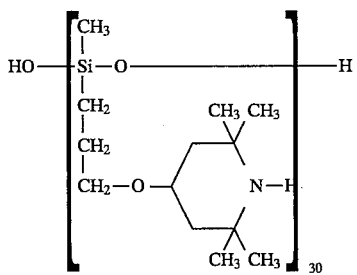 $(CH_2)_3OCH_2CH(OH)CH_2N(Bu)$— | NH | 98.5 | 0.48 | PS |
| 2 | P2 $(CH_2)_3OCH_2CH(OH)CH_2N(Bu)$— | NH | 18.7 | −0.32 | PS |
| A | C1 $(CH_2)_3NH_2$ | | 14.3 ($NH_2$) | 9.23 | PS |
| B | C2 $(CH_2)_3NH(CH_2)_2NH_2$ | | 31.2 ($NH + NH_2$) | 28.50 | PS |
| C | C3 $(CH_2)_3OCH_2CH(OH)CH_2N(CH_2CH_2OH)_2$ | | 9.0 (tertiary N) | 3.32 | PS |

EXAMPLE 4

Preparation of another polydiorganosiloxane containing tetramethylpiperidine functional groups.

The following are introduced into a reactor equipped with a stirrer, a thermometer, a reflux condenser and a system for introducing dry nitrogen:

949 g (3.21 mol) of octamethylcyclotetrasiloxane, 44.8 g of polydiorganosiloxane compound of average formula:

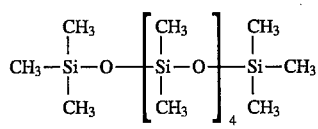

4.3 g of polydimethylsiloxane compound of average formula:

$$CH_3-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_4-\underset{\underset{CH_3}{|}}{\overset{\overset{CH_3}{|}}{Si}}-CH_3$$

All the reactants were degassed beforehand with nitrogen. The reaction medium is brought to 145°–155° C. 0.104 g (0.0018 mol) of KOH as an aqueous solution (20% by weight) are added. After reacting for 3 hours, the catalyst is neutralized with 0.138 g (0.0012 mol) of phosphoric acid (containing 85% by weight of pure acid), the same temperature being maintained for 1 hour. The reaction mixture is evaporated under reduced pressure (6.65·10² Pa) for 3 hours. 886 g of silicone oil and 105 g of distillate are thus obtained.

The basicity value of the silicone oil is 18.8 meq/100 g of polymer (the theoretical value being 18.0 meq/100 g).

Proton and silicon nuclear magnetic resonance (NMR) analyses are carried out. Interpretation of the spectra confirms the structure of the expected product, that is to say a product of average formula (product P3):

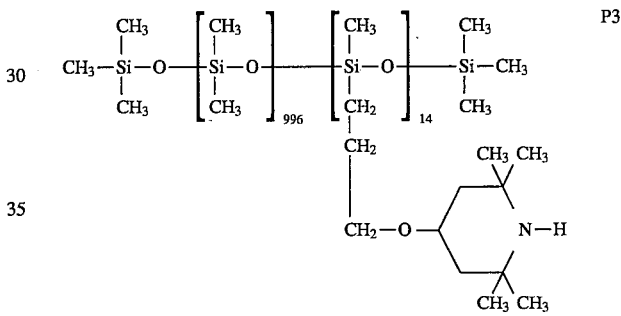

EXAMPLE 5

Description of the application tests of the silicone product P3 according to Example 4.

The application tests are carried out on pieces of cloth which have been prepared and treated as indicated hereinabove in Example 3:

with the white spirit solution containing the silicone product P3;

with the white spirit solution which does not contain any silicone product (Comparative Example D); and with the white spirit solution containing a silicone compound C2 according to the prior art and described hereinabove in Example 3 (Comparative Example E).

The pieces of treated cloth are dried and then heated as indicated hereinabove in Example 3.

The degrees of yellowing, expressed by the relative whiteness index ΔWI, are evaluated as indicated hereinabove in Example 3.

Handling tests are also carried out as indicated hereinabove in Example 3.

The results obtained are collated in the following table:

| Ex. | Silcon product and Functionalization | Basicity value in meq/100 g of product | ΔWI | Handle |
|---|---|---|---|---|
| 5 | P3  (CH₂)₃O— ...—NH | 18.8 | −0.18 | PS |
| D | No silicon product | — | 0 | US |
| E | C2 (CH₂)₃NH(CH₂)₂NH₂ | 30.0 (NH + NH₂) | 26.80 | PS |

We claim:
1. Process for conditioning textile materials characterized in that the textile materials are brought into contact with a composition comprising a polyorganosiloxane having, per mole, at least one unit of general formula:

$$(R)_a(X)_bZSiO_{\frac{3-(a+b)}{2}} \quad (I)$$

in which:
the symbols R are identical or different and represent a monovalent hydrocarbon radical chosen from linear or branched alkyl radicals having from 1 to 4 carbon atoms, the phenyl radical and the 3,3,3-trifluoropropyl radical;
the symbols X are identical or different and represent a monovalent radical chosen from a hydroxyl group and a linear or branched alkoxyradical having from 1 to 3 carbon atoms;
Z represents a residue containing a sterically hindered piperidyl group chosen from the group consisting of: the residues of formula:

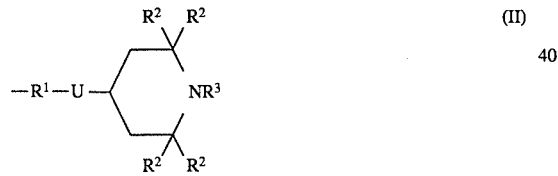

(II)

in which:
—$R^1$ is a divalent hydrocarbon radical chosen from:
linear or branched alkylene radicals having from 2 to 18 carbon atoms;
alkylenecarbonyl radicals in which the linear or branched alkylene part contains 2 to 20 carbon atoms;
alkylenecyclohexylene radicals in which the linear or branched alkylene part contains from 2 to 12 carbon atoms and the cyclohexylene part contains an —OH group and optionally 1 or 2 alkyl radicals having from 1 to 4 carbon atoms;
radicals of formula —$R^4$—O—$R^5$— in which the radicals $R^4$ and $R^5$, which are identical or different, represent alkylene radicals having 1 to 12 carbon atoms;
radicals of the formula —$R^4$—O—$R^5$— in which the radicals $R^4$ and $R^5$ have the meanings indicated above and one of them or both are substituted by one or two —OH groups;
radicals of formulae —$R^4$—COO—$R^5$ and —$R^5$—OCO—$R^5$— in which $R^4$ and $R^5$ have the meanings above;
radicals of formula —$R^6$—O—$R^7$—O—CO—$R^8$— in which $R^6$, $R^7$ and $R^8$, which are identical or different, represent alkylene radicals having from 2 to 12 carbon atoms and the radical $R^7$ is optionally substituted by a hydroxyl group;
U represents —O— or —$NR^9$—, $R^9$ being a radical chosen from a hydrogen atom, a linear or branched alkyl radical having from 1 to 6 carbon atoms, a divalent radical —$R^1$— having the meaning indicated above, one of the valency bonds being connected to the nitrogen atom of —$NR^9$— and the other being connected to a silicon atom, and a divalent radical of formula:

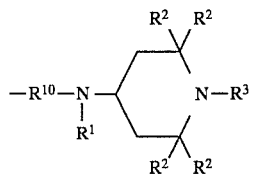

in which $R^1$ has the meaning indicated above, $R^2$ and $R^3$ have the meanings indicated hereinbelow and $R^{10}$ represents a linear or branched alkylene radical having from 1 to 12 carbon atoms, the valency bond of $R^{10}$ being connected to the nitrogen atom of —$NR^9$— and the valency bond of $R^1$ being connected to a silicon atom;
$R^2$ are radicals, which are identical or different, chosen from linear or branched alkyl radicals having from 1 to 3 carbon atoms and the phenyl radical;
$R^3$ represents a hydrogen atom or the radical $R^2$;
and those of formula:

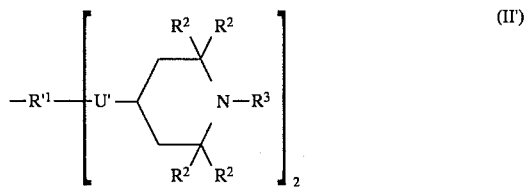

(II')

in which
$R'^1$ is chosen from a trivalent radical of formula:

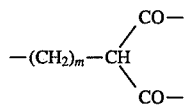

where m represents a number from 2 to 20,
and a trivalent radical of formula:

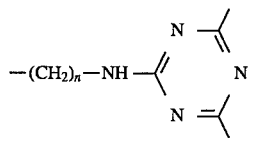

where n represents a number from 2 to 20
U' represents —O— or —$NR^{11}$—, $R^{11}$ being a hydrogen atom or a linear or branched alkyl radical having from 1 to 6 carbon atoms;
$R^2$ and $R^3$ have the same meanings as those given with respect to the formula (II);
a is a number chosen from 0, 1 and 2;

b is a number chosen from 0, 1 and 2;

the sum a+b is not greater than 2.

2. Process according to claim 1, characterized in that the polyorganosiloxane used additionally comprises at least one other unit of formula:

   (III)

in which:

the symbols R and X have the same meanings as those given hereinabove with respect to the formula (I);

the symbol V represents: a linear or branched alkyl radical having from 5 to 20 carbon atoms; a radical of formula $-(CH_2)_p-COO-R^{12}$ in which p represents a number from 5 to 20 and $R^{12}$ represents a linear or branched alkyl radical containing 1 to 12 carbon atoms; a radical of formula $-(CH_2)_q-O-R^{13}$ in which q represents a number from 3 to 10 and $R^{13}$ represents a hydrogen atom, an ethylene oxide chain, a propylene oxide chain, a mixed ethylene oxide and propylene oxide chain or an acyl radical having from 2 to 12 carbon atoms;

c is a number chosen from 0, 1 and 2;

d is a number chosen from 0, 1 and 2;

the sum c+d is not greater than 2.

3. Process according to claim 1, characterized in that the polyorganosiloxane used additionally comprises a unit of formula:

   (IV)

in which:

R and X have the same meanings as those given with respect to the formula (I);

e is a number chosen from 0, 1, 2 and 3;

f is a number chosen from 0, 1, 2 and 3;

the sum e+f is not greater than 3.

4. Process according to claim 1, characterized in that the polyorganosiloxane used is a linear polydiorganosiloxane of formula:

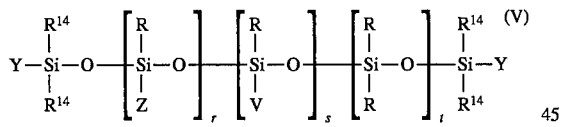   (V)

in which:

the symbols R, Z and V have the meanings given hereinabove with respect to the formulae (I) and (III);

the symbol Y represents a monovalent radical chosen from the radicals R, Z, V and X;

the symbols $R^{14}$ are identical or different and represent a monovalent radical chosen from a radical R and a radical X such as defined hereinabove with respect to the formula (I);

r, s and t are equal to zero or represent integers or fractional numbers greater than 0, with the additional condition according to which, if r=0, at least one of the two radicals Y represents the radical Z.

5. Process according to claim 1, characterized in that use is made of a polyorganosiloxane containing formulae (I) or a polyorganosiloxane of formula (V):

which has per mole, on average: from 2 to 1600 silicon atoms, from 1 to 100 residues Z, such as those defined hereinbelow, and from 0 to 50 residues V, such as those defined hereinbelow;

and in the structure of which:

R is chosen from methyl, ethyl, n-propyl and isopropyl radicals;

X is chosen from hydroxyl, methoxy and ethoxy radicals;

Z is chosen from residues containing a piperidyl group selected from the group consisting of those:

of formula (II) in which:

$R^1$ represents a hydrocarbon radical chosen from:

linear or branched alkylene radicals having from 3 to 12 carbon atoms;

the radical $-(CH_2)_{10}-CO-$;

alkylenecyclohexylene radicals in which the linear or branched alkylene part contains from 2 to 6 carbon atoms and the cyclohexylene part contains an $-OH$ group and optionally 1 or 2 alkyl substituents having 1 to 4 carbon atoms;

radicals of formula $-R^4-O-R^5-$ in which the radicals $R^4$ and $R^5$, which are identical or different, represent alkylene radicals having 2 to 6 carbon atoms;

radicals of formula $-R^4-O-R^5-$ in which the radicals $R^4$ and $R^5$ have the meanings indicated above and $R^5$ is substituted by an OH group;

radicals of formula $-R^4-COO-R^5-$ and $-R^4-OCO-R^5-$ in which $R^4$ and $R^5$ have the meanings above;

radicals of formula $-R^6-O-R^7-O-CO-R^8-$ in which $R^6$, $R^7$ and $R^8$, which are identical or different, represent alkylene radicals having from 2 to 6 carbon atoms and the radical $R^7$ is substituted by a hydroxyl group;

U represents $-O-$ or $-NR^9-$ where $R^9$ is a linear or branched alkyl radical having from 1 to 4 carbon atoms;

$R^2$ represents a methyl radical;

and those of formula (II') in which:

$R'^1$ is chosen from:

a trivalent radical of formula:

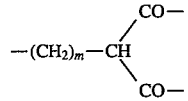

where m represents a number from 2 to 10, and a trivalent radical of formula:

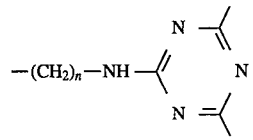

where n represents a number from 2 to 10;

U' represents $-O-$ or $-NR^{11}-$, $R^{11}$ being a linear or branched alkyl radical having from 1 to 4 carbon atoms;

$R^2$ represents a methyl radical;

V is chosen from: a linear or branched alkyl radical having 5 to 18 carbon atoms; a radical of formula $-(CH_2)_{10}-COO-R^{12}$ in which $R^{12}$ represents a linear alkyl radical containing 1 to 6 carbon atoms; a radical of formula $-(CH_2)_3-O-R^{13}$ where $R^{13}$ represents a hydrogen atom, an ethylene oxide chain, a propylene oxide chain, a mixed ethylene oxide and propylene oxide chain or an acyl group having from 2 to 6 carbon atoms.

6. Process according to claim 5, characterized in that the linear polydiorganosiloxane of formula (V) has the following values for the symbols r, s and t:

r is an integer or fractional number ranging from 0 to 98 with a condition according to which, if r=0, at least one of the two radicals Y represents the radical Z;

s is an integer or fractional number ranging from 0 to 48;

t is an integer or fractional number ranging from 0 to 1598;

the sum r+s+t is an integer or fractional number ranging from 0 to 1598.

7. Process according to claim 1, characterized in that the composition comprises a polyorganosiloxane possessing 5 to 200 milliequivalents of hindered piperidyl groups.

8. Process according to claim 1, characterized in that the composition used is in the form of solutions, dispersions or emulsions.

9. Process according to claim 1, characterized in that it is used on a textile material based on cotton, polyester, polyamide, viscose, polyacrylate, wool, cellulose acetate or a mixture of these.

10. Process according to claim 1, characterized in that the amount of polysiloxane deposited on the textile material corresponds to an amount of between 0.1 and 2% by weight with respect to the weight of the textile material.

* * * * *